United States Patent Office 3,352,181
Patented Nov. 14, 1967

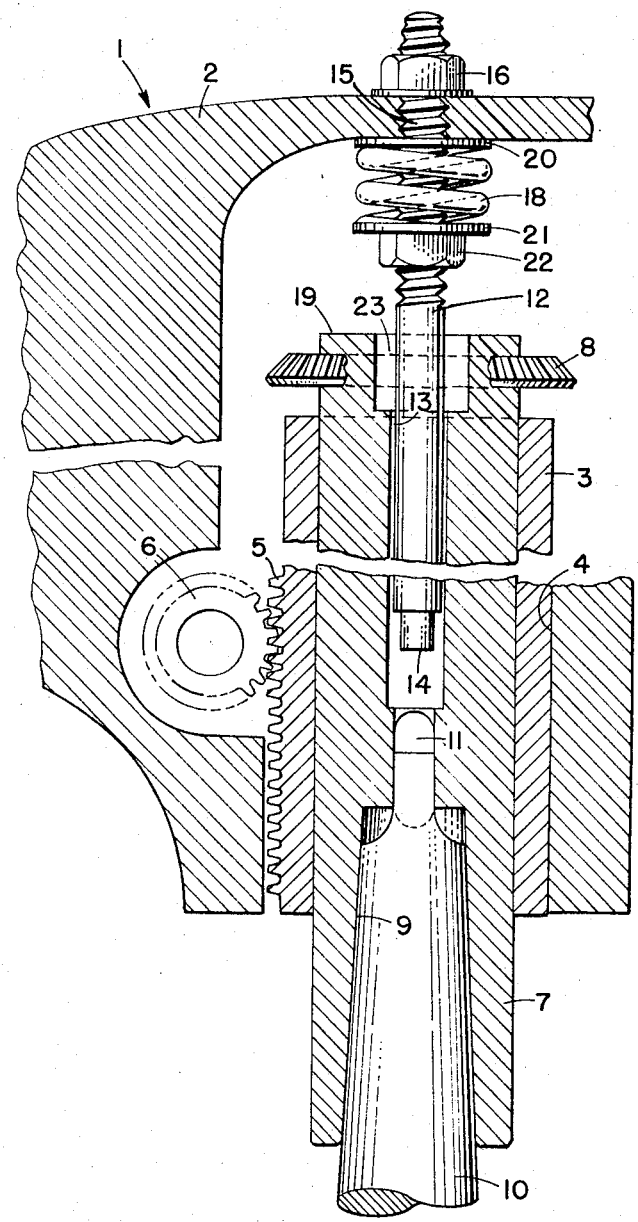

3,352,181
TOOL EJECTOR
George B. Hilbrunner, 1215 Howe Road,
Kent, Ohio  44240
Filed Aug. 25, 1965, Ser. No. 482,359
2 Claims. (Cl. 77—55)

ABSTRACT OF THE DISCLOSURE

A tool ejector device for a machine tool spindle wherein a knockout rod is fixedly mounted to the frame of the machine tool and is slidably received within a bore of the spindle. The bore connects with the tool receiving socket of the spindle so that raising the spindle upwardly effects movement of the knockout rod into the tool receiving socket. A spring encompasses the rod between a portion of the frame and the upper end of the spindle with tool knockout action being achieved only after further upward movement of the spindle to compress the spring after the upper end of the spindle initially engages the spring.

The present invention relates to tool ejectors, and particularly to apparatus or means adapted to be associated with a machine tool spindle to facilitate positive knockout of a tool carried by the machine tool spindle, when removal of the tool is desired.

Heretofore there have been various constructions provided to endeavor to facilitate ejection of a tool from a machine tool spindle, and most machines in use today require the use of some type of a manually controlled knockout pin that is pounded into a machine tool spindle to eject a tool therefrom. Some efforts have been made heretofore to provide a different types of knock-out means for these tools and some of the prior constructions are shown in U.S. Patents Nos. 1,405,921, 2,625,845 and 2,618,180. However, all of such prior types of devices, for one reason or another, have not been completely satisfactory. Hence, it still is a reoccurring problem in machine shops to eject tools readily and easily from the machine tool spindle when change or removal of a tool is required.

The general object of the present invention is to provide a novel and improved tool ejection device which is characterized by the simplicity of construction thereof and by the ease with which such ejection device can be built into an existing machine tool or a new machine tool, as desired.

Another object of the invention is to provide a machine tool ejection device for use in association with the machine tool spindle and wherein normal operative movements of the machine tool will not provide tool ejection action.

A further object of the invention is to provide a machine tool ejection device in a machine tool spindle wherein tool ejection action is only provided when movement of the machine tool spindle against resilient resisting means is provided.

Another object of the invention is to provide a tool ejection device in a machine tool spindle, which device is positive in action and is of a sturdy construction to provide a long service life with a minimum or no maintenance thereon.

Other objects and advantages of the present invention will be made more apparent as the specification proceeds.

Attention now is particularly directed to the accompanying drawing that shows one currently preferred embodiment of an ejection device illustrating the principles of the present invention.

When referring to corresponding members shown in the drawings and referred to in the specification, corresponding numerals are used to facilitate comparison therebetween.

The present invention, generally speaking, as to one embodiment thereof, relates to a tool ejector device for use in a machine tool spindle including a frame, a sleeve in which the spindle is rotatably positioned, which sleeve is reciprocably positioned in the frame, and where the tool ejector device comprises a rod operably carried by the frame, and where the tool ejector device comprises a rod operably carried by the frame, which rod is received in a bore provided in the spindle, the spindle bore connecting to a tool receiving socket provided in the spindle, a spring means encompassing the rod intermediate a portion of the frame and adjacent end of the spindle, and means operatively securing the spring against a stop, which rod has a remote end that can extend into the tool receiving socket of the spindle to eject the tool therefrom when the spindle is moved towards and compresses the spring, the rod having a length to prevent tool ejection by bringing the spindle end into only contact with the spring.

Attention now is particularly directed to the details of the structure shown in the drawings, and a machine tool is indicated as a whole by the numeral 1. This machine tool may be of any suitable type and the invention is particularly illustrated with relation to a drill press and it will be described as used in association with such type of a tool. This machine tool 1 includes a frame 2 that receives a sleeve 3 in a suitable bore 4 provided in the frame 2. The sleeve 3 either has a rack gear 5 suitably secured thereto, or else the gear may be formed integrally with the sleeve 3, as desired. Conventional means, such as a pinion 6, is operatively carried by the frame 2 with the pinion 6 engaging the rack gear 5 whereby rotation of the pinion in any conventional manner will cause vertical movement of the sleeve 2 with relation to the frame. The sleeve 3 receives a machine tool spindle 7 therein, which spindle is journalled in the sleeve 3 by any suitable means (not shown) whereby the spindle 7 can rotate with relation to the sleeve 3, but will be moved vertically therewith. At an exposed upper end of the spindle 7, a bevel gear 8 or other equivalent member is provided and suitable means (not shown) connect to this gear 8 for rotary drive of the spindle 7 as is conventional in machine tools of this type.

The drawing clearly shows that the spindle 7 has a tapered socket 9 provided in a lower end of the spindle and a drill or other tool 10 is wedged into engagement with the socket 9. A conventional transversely extending knockout slot 11 is formed in the spindle 7 and extends through the sleeve 3 for conventional knock-out of the tool 10 if ever required.

As an important feature of the present invention, a knock-out rod 12 is secured to the frame 2 and is positioned on the axis of the spindle 7. The spindle 7 has a bore 13 in which the rod 12 is slidably received with the lower end of the rod indicated at 14 terminating, in normal use of the machine tool 1, slightly above the upper end of the tool 10 received in the slot 11. The rod end 14 is adapted to be forced into a portion of the socket 9 for forceably ejecting the tool therefrom, as described hereinafter in more detail.

This rod 12 preferably has a threaded section 15 provided on its upper end engaging a tapped hole in the frame. A nut 16 is shown engaged with the upper end of the rod 12 and it bears on the machine tool frame 2 to secure the rod fixedly to the frame 2. Hence, by adjustment of the nut 16 and turning the rod, the position of the rod 12 with relation to the frame 2 and the axial position of the rod relative to the spindle 7 may be varied, as desired.

It is an important feature of the present invention that a resilient member, such as a coil spring 18, is operatively associated with the rod 12. In this instance, the coil spring 18 is in telescoped engagement with the rod 12 intermediate the adjacent, in this instance the upper end of the spindle 7, indicated at 19, and the adjacent portion of the frame 2. Such spring is operatively secured to the rod and frame by abutting the upper end of the spring 18 against the frame or a suitable stop secured to the frame and/or a suitable washer 20 carried thereby, while the lower end of the spring usually engages a washer 21 which is resiliently urged thereagainst by a lock nut 22. The end 19 of the spindle is shown with a recess 23 into which the lock nut 22 will be received when the spindle 7 is moved upwardly of the apparatus to bring the end 19 of the spindle into engagement with the washer 21, or coil spring 18. Hence, in normal vertical or upward movement of the spindle 7 with relation to the frame 2, a warning will be given by the apparatus of the invention to show that further upward movement of the spindle will cause tool knock-out action. The lower end 14 of the rod 12 hence will not extend into or be moved into the tool receiving socket 9 until the coil spring 18 is compressed by forcing the spindle 7 upwardly by the pinion 6 to compress the coil spring 18 and at that time a positive knock-out action will be obtained on the tool received in the tool spindle. However, accidental knock-out of the tool is prevented.

From the foregoing, it will be seen that a positive acting, but relatively uncomplicated knock-out means has been provided by the apparatus of the invention. Such apparatus will not normally ever be caused to provide tool ejection action unless that is positively desired. The apparatus is sturdy and will function over a long service life. The apparatus can be added, usually, easily to an existing machine tool whereby it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A tool ejector device in a machine tool including a frame, a sleeve received for vertical reciprocal movement in said frame, means for causing vertical movement of the sleeve with relation to the frame, a spindle journaled in said sleeve whereby this spindle rotates in relation to said sleeve but is moved vertically therewith, said spindle having a tool receiving socket at one end and having a longitudinally extending bore which connects the other end thereto, the improvement characterized by a vertically extending knockout rod fixedly carried by said frame and being slidably received by the bore in said spindle, said rod having a threaded section provided on its upper end engaging a tapped hole in said frame whereby rotation of said rod varies the relation of the rod with the frame and varies the axial position of the rod relative to the spindle, a spring secured in encompassing relationship to said rod between said frame and the upper end of said spindle, the upper end of the spring abutting against said frame whereby as said spindle is moved upwardly, the upper end of said spindle being adapted to operatively engage the lower end of said spring whereupon further upward movement of the spindle against the spring affects compression of said spring to allow the lower end of said rod to extend into the tool receiving socket of said spindle.

2. The combination according to claim 1 wherein the upper end of the spindle has a central recess therein, and wherein spring positioning means are provided for the lower end of said spring and including a washer and a lock nut retaining said washer against the lower end of said spring, said lock nut being received in said recess as said spindle is moved upwardly and the upper end of said spindle engages said washer and forces it and said spring upwardly.

References Cited

UNITED STATES PATENTS

| | | | |
|---|---|---|---|
| 409,674 | 8/1889 | Fairfield et al. | 279—1 |
| 644,929 | 3/1900 | Landis | 77—55 |
| 1,761,181 | 6/1930 | Chace | 77—55 |
| 2,625,845 | 1/1953 | Thelming | 77—55 |
| 2,786,688 | 3/1957 | Ineichen | 77—55 |

FRANCIS S. HUSAR, *Primary Examiner.*